United States Patent Office 3,349,071
Patented Oct. 24, 1967

3,349,071
REDUCING COLD FLOW OF DIENE
POLYMERS
Charles W. Strobel, Bartlesville, Okla., assignor to Phillips
Petroleum Company, a corporation of Delaware
No Drawing. Filed Oct. 17, 1963, Ser. No. 317,031
5 Claims. (Cl. 260—94.7)

This invention relates to a process of reducing the cold flow of diene polymers and to polymers resulting from the process.

In the manufacture and processing of elastomeric hydrocarbon polymers and copolymers, and particularly in packaging, shipping, and storage, certain difficulties have been encountered because of the tendency of these materials to cold flow in the unvulcanized state. For example, in the event that cracks or punctures develop in a package of rubber, the polymer or copolymer tends to flow therefrom—leading to product loss or contamination, or causing the packages to stick together.

An object of my invention is to provide an improved method of preparing conjugated diene polymers. A further object is to provide a method whereby conjugated dienes can be polymerized in the presence of an organolithium initiator to produce a product having low cold flow. A further object is to provide an improved conjugated diene polymer which has been prepared in the presence of an organolithium initiator and which has very little tendency to flow in the uncured state. Other objects and advantages of the invention will be apparent to one skilled in the art upon reading this disclosure.

I have found that treating the polymerization zone effluent containing a solution of such elastomeric hydrocarbon polymers and copolymers with carbon disulfide to effect termination produces material having considerably less tendency to cold flow than do polymers terminated with alcohols, water or rosin acid. The amount of carbon disulfide used depends in part on the amount of catalyst used and in part on the hydrocarbon polymer or copolymer being terminated, and ranges from about 0.01 to about 50 millimols or more per 100 parts by weight of polymer, preferably from about 0.1 to about 20 millimols per 100 parts of polymer. After addition of the carbon disulfide to the solution, the solution is mixed for a period of time. This is preferably done for a period of 15 minutes to 2 hours at a temperature of 25 to 125° C.

In general, the polymers that can be treated by the process of my invention are those of conjugated dienes containing from 4 to 12 carbon atoms per molecule, preferably 4 to 8 carbon atoms per molecule. Examples of the conjugated dienes that can be used are: 1,3-butadiene, 2-methyl-1,3-butadiene (isoprene), 2,3-dimethyl-1,3 - butadiene, 1,3-pentadiene (piperylene), 2-methyl - 1,3 - hexadiene, 1,3-octadiene, and the like. Mixtures of dienes can be used. Vinyl-substituted aromatic compounds containing 8 to 16 carbon atoms per molecule, preferably 8 to 12 carbon atoms per molecule can be copolymerized in minor amount, less than 50 percent by weight, with the diene. Examples of such compounds are styrene, 3-vinyltoluene, 1-vinylnaphthalene, 2-vinylnaphthalene, 2-methylstyrene, and the like.

The organolithium compound used as a catalyst in the practice of the process of this invention corresponds to the general formula RLi, wherein R is a hydrocarbon radical selected from the group consisting of aliphatic, cycloaliphatic and aromatic radicals. The R preferably contains from 1 to 20, inclusive, carbon atoms, although it is within the scope of the invention to use higher molecular weight compounds. Examples of organolithium compounds which can be used include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4 - cyclohexylbutyllithium, 2,4,6-tri-n-butylcyclohexyllithium, 2,3,5 - tri-isobutylphenyllithium, 1-lithio-3,5-diphenyloctane, 4-lithio-2,7-dicyclohexyloctane, n-eicosyllithium, and the like.

Such polymerization systems have been extensively investigated by prior workers in the art.

Compounds that have been used as shortstopping or terminating agents in conventional practice include water, alcohols, and rosin acid. These materials give products having relatively high cold flow. In the following non-limiting examples, isopropyl alcohol was used for termination in the control runs to make products for comparison with those partially or totally terminated with carbon disulfide.

*Example I*

Butadiene was polymerized and terminated according to prior art teaching using the following recipe and conditions to furnish a series of products of varying viscosity whose cold flow can be compared with polymers prepared with the terminating agent of this invention.

|  | Parts by weight |
|---|---|
| 1,3-butadiene | 100 |
| Cyclohexane | 780 |
| n-Butyllithium | Variable |
| Temperature, ° C. | 50 |
| Time, hr. | 5.5 |

Cyclohexane was charged to the reactor bottles, and they were purged with nitrogen and capped with rubber lined perforated crown caps. Butadiene was charged followed with a cyclohexane solution of n-butyllithium. The bottles were then tumbled in a constant temperature bath at 50° C. for 5.5 hours. At that time the reaction was terminated and the polymers coagulated with sufficient isopropyl alcohol containing 10 weight percent 2,2'-methylene - bis(4 - methyl-6-tert-butylphenol) antioxidant (AO–2246) to give one part by weight of antioxidant per 100 parts of polymer. The following products were obtained.

| Run No. | n-Butyl-lithium, mhm. | Viscosity | | Cold Flow, mg./min. |
|---|---|---|---|---|
| | | Inherent | Mooney, ML–4 | |
| 1 | 0.90 | 3.20 | 128 | 6 |
| 2 | 0.95 | 2.90 | 100 | 9 |
| 3 | 1.00 | 2.68 | 78 | 13 |
| 4 | 1.05 | 2.51 | 58 | 15 |
| 5 | 1.10 | 2.39 | 51 | 22 |
| 6 | 1.15 | 2.09 | 29 | 45 |
| 7 | 1.20 | 2.14 | 30 | 47 |
| 8 | 1.25 | 1.97 | 22 | 62 |
| 9 | 1.30 | 2.04 | 15 | 72 |
| 10 | 1.50 | 1.56 | 8.5 | 150 |
| 11 | 1.60 | 1.46 | 6 | 170 |

*Example II*

Butadiene was polymerized using the recipe and conditions of Example I, except that after 4 hours reaction time (3 hours in Run 12) 4 mhm. of carbon disulfide was added for termination, and then the bottles were tumbled for an additional hour (1.25 hours in Run 12) at 50° C.; subsequent handling (coagulation and recovery) was the same as in Example I. Properties are shown in the following table:

| Run No. | n-Butyl-lithium mhm. | Viscosity | | Cold Flow, mg./min. | Cold Flow of Example I Polymer of Comparable ML-4 |
|---|---|---|---|---|---|
| | | Inherent | Mooney, ML-4 | | |
| 12[1] | 1.4 | 2.01 | 49.0 | 0.7 | 22 |
| 13 | 1.4 | 1.88 | 31.0 | 4.54 | 47 |
| 14 | 1.6 | 1.88 | 23.5 | 6.25 | 62 |
| 15 | 1.8 | 1.53 | 16.5 | 20.40 | 72 |

[1] Blend of 6 separate runs; polymerization time, 3 hours; tumbling time 1.25 hours.

The last two columns of this table illustrate the surprising advantage obtained by terminating the polymer with carbon disulfide, the last column showing data taken from Example I. Using carbon disulfide, the cold flow is greatly decreased.

*Example III*

Butadiene was polymerized using the recipe and conditions of Example I, except that 2.0 mhm. of n-butyllithium was added in each run and that after 4 hours reaction time varying amounts of carbon disulfide were added for termination. The bottles were tumbled for an additional hour at 50° C. and the polymers coagulated and recovered as in Example I.

| Run No. | Carbon disulfide, mhm. | Inherent Viscosity | Cold Flow, mg./min. |
|---|---|---|---|
| 16 | 0.25 | 1.59 | 8.9 |
| 17 | 0.50 | 1.54 | 6.3 |
| 18 | 1.0 | 1.59 | 12.4 |
| 19 | 2.0 | 1.59 | 6. |
| 20 | 4.0 | 1.57 | 626 |
| 21 | 20.0 | 1.63 | 15.6 |

The inherent viscosity of these polymers prepared with a constant amount of n-butyllithium catalyst was not substantially affected by varying the amount of $CS_2$ used for termination, being about 1.6 in all cases. The cold flow ranged from 6.3 to 15.2 mg./min., compared with about 150 mg./min. for a polymer of comparable inherent viscosity (see Example I, Run 10) made without $CS_2$ termination.

*Example IV*

This run illustrates that the result of this invention appears to be specific to carbon disulfide. Other sulfur compounds tried do not give the improvement. Butadiene was polymerized using the recipe and conditions of Example I with 1.1 mhm. of n-butyllithium and a reaction time of 4 hours. At the end of 4 hours, a sample of the polymer solution was removed and the polymer therein was coagulated with isopropyl alcohol and tumbled for an additional 14 hours at 50° C. The cold flow of this polymer is shown under "Control" in the following table. To the remaining solution, 0.1 phm. of the sulfur compound shown was added and the bottles were tumbled for an additional 14 hours at 50° C. Subsequent handling was the same as in Example I. The cold flow was then determined. It is reported under "After Termination" in the table. These other sulfur compounds did not reduce cold flow and in two of the three runs produced a product with higher cold flow.

| Run No. | Terminating Agent | Cold Flow, mg./min. | | Mooney ML-4 After Termination |
|---|---|---|---|---|
| | | Control | After Termination | |
| 22 | $nC_4H_9$—S—$nC_4H_9$ | 44.9 | 43.5 | 6.5 |
| 23 | $nC_4H_9$—S—S—$nC_4H_9$ | 48.8 | 82.0 | 12.0 |
| 24 | HSH | 31.0 | 40.9 | 16.5 |

Cold flow was determined in all the examples by extruding the rubber through a ¼ inch orifice having a length of 0.107 inch at 3.5 p.s.i. pressure at a temperature of 122° F. After allowing 10 minutes to reach steady state, the rate of extrusion is measured and the value reported in milligrams per minute.

For the inherent viscosity determination, one tenth gram of polymer was placed in a wire cage made from 80 mesh screen and the cage was placed in 100 ml. of toluene contained in a wide-mouth, 4-ounce bottle. After the polymer remained in contact with the solvent for 24 hours at room temperature (approximately 25° C.), the cage was removed and the solution filtered to remove any solid particles present. The resulting solution was run through a Medalia-type viscometer supported in a 25° C. temperature bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

Mooney viscosity is determined by ASTM D1646-61, using a Mooney viscometer, large rotor, 4 minutes, and 212° F.

As many possible embodiments can be made of this invention without departing from the scope thereof, it is to be understood that all matter herein set forth is to be interpreted as illustrative and not as unduly limiting the invention.

I claim:
1. In a polymerization process in which a conjugated diene of 4 to 8 carbon atoms is polymerized in the presence of a compound of the formula RLi where R is a hydrocarbon radical selected from the group consisting of aliphatic, cycloaliphatic, and aromatic radicals, the improvement comprising terminating the polymerization by adding 0.01 to 50 millimols per 100 parts of polymer of carbon disulfide to the polymerization mixture, agitating the polymerization mixture for 15 minutes to 2 hours at a temperature of 25 to 125° C., and recovering the polymer, said polymer having reduced cold flow.

2. The process of claim 1 wherein said diene is 1,3-butadiene.

3. In a polymerization process in which 1,3-butadiene is polymerized in the presence of n-butyllithium, the improvement comprising terminating the polymerization by adding 0.01 to 50 millimols per 100 parts of polymer of carbon disulfide to the polymerization mixture, agitating the polymerization mixture for 15 minutes to 2 hours at a temperature of 25 to 125° C., and recovering the polymer, said polymer having reduced cold flow.

4. The product produced by the process of claim 1.
5. The product produced by the process of claim 3.

References Cited
UNITED STATES PATENTS

| 3,070,579 | 12/1962 | Szwarc | 260—93.5 |
| 3,135,716 | 6/1964 | Uraneck et al. | 260—94.7 |
| 3,213,075 | 10/1965 | Sonnenfeld | 260—94.7 |
| 3,244,664 | 4/1966 | Zelinski et al. | 260—94.7 |

J. A. SEIDLECK, *Primary Examiner.*

JOSEPH L. SCHOFER, *Examiner.*

E. J. SMITH, *Assistant Examiner.*